United States Patent
Matsui (10) Patent No.: US 11,250,273 B2
(45) Date of Patent: Feb. 15, 2022

(54) PERSON COUNT APPARATUS, PERSON COUNT METHOD, AND NON-TRANSITORY COMPUTER-READABLE STORAGE MEDIUM

(71) Applicant: CANON KABUSHIKI KAISHA, Tokyo (JP)

(72) Inventor: Taichi Matsui, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 71 days.

(21) Appl. No.: 16/697,425

(22) Filed: Nov. 27, 2019

(65) Prior Publication Data

US 2020/0097736 A1 Mar. 26, 2020

Related U.S. Application Data

(63) Continuation of application No. PCT/JP2018/015324, filed on Apr. 12, 2018.

(30) Foreign Application Priority Data

May 30, 2017 (JP) .............................. JP2017-107067

(51) Int. Cl.
*G06K 9/00* (2006.01)
*G06T 7/215* (2017.01)

(52) U.S. Cl.
CPC ..... *G06K 9/00778* (2013.01); *G06K 9/00369* (2013.01); *G06T 7/215* (2017.01); *G06T 2207/30242* (2013.01)

(58) Field of Classification Search
CPC .............. G06F 3/147; G06K 9/00677; G06K 9/00771; G06K 9/00624; G06T 2207/30196
See application file for complete search history.

(56) References Cited

U.S. PATENT DOCUMENTS 7,936,372 B2 5/2011 Murakami et al.
10,474,972 B2 11/2019 Iwai
(Continued)

FOREIGN PATENT DOCUMENTS

JP 2005-135188 A 5/2005
JP 2005135188 A * 5/2005
(Continued)

OTHER PUBLICATIONS

International Search Report and Written Opinion dated Jul. 10, 2018, in International Patent Application No. PCT/JP2018/015324.
(Continued)

*Primary Examiner* — Guillermo M Rivera-Martinez
(74) *Attorney, Agent, or Firm* — Venable LLP (57) ABSTRACT

A person count apparatus obtains a person count result of a region person count that counts the number of persons existing in a predetermined region of an image captured by an image capturing unit and a person count result of a passing person count that counts the number of persons passing a predetermined line set in an image captured by the image capturing unit, displays a still image captured by the image capturing unit in a time period corresponding a person count result selected from the plurality of person count results for each time period based on the region person count, and reproduce a moving image captured by the image capturing unit on the display unit in a time period corresponding to a person count result selected from the plurality of person count results for each time period based on the passing person count.

9 Claims, 8 Drawing Sheets

(56) References Cited

U.S. PATENT DOCUMENTS

| | | | |
|---|---|---|---|
| 2006/0067456 A1* | 3/2006 | Ku | G07C 9/00 377/6 |
| 2007/0248244 A1* | 10/2007 | Sato | G08B 13/19608 382/103 |
| 2008/0016541 A1 | 1/2008 | Murakami et al. | |
| 2008/0212099 A1* | 9/2008 | Chen | G08B 13/19608 356/408 |
| 2011/0158482 A1* | 6/2011 | Johnson | G06K 9/00771 382/107 |
| 2012/0020518 A1* | 1/2012 | Taguchi | G06T 7/292 382/103 |
| 2014/0059134 A1* | 2/2014 | Chiu | H04N 21/4668 709/204 |
| 2014/0152763 A1* | 6/2014 | Lim | G06K 9/00778 348/36 |
| 2014/0355829 A1* | 12/2014 | Heu | G06T 7/20 382/103 |
| 2015/0278588 A1* | 10/2015 | Matsumoto | G06K 9/00348 382/103 |
| 2015/0294183 A1* | 10/2015 | Watanabe | G07C 9/28 382/203 |
| 2016/0307049 A1* | 10/2016 | Hagisu | G06F 21/60 |
| 2016/0321507 A1 | 11/2016 | Yang | |
| 2017/0206669 A1* | 7/2017 | Saleemi | G06T 7/292 |
| 2017/0308843 A1* | 10/2017 | Iwai | H04N 7/181 |
| 2017/0330330 A1* | 11/2017 | Seki | H04N 7/181 |
| 2018/0307913 A1* | 10/2018 | Finn | G06K 9/00778 |

FOREIGN PATENT DOCUMENTS

| | | | |
|---|---|---|---|
| JP | 2005-143016 A | | 6/2005 |
| JP | 2005148863 A | * | 6/2005 |
| JP | 2008-016895 A | | 1/2008 |
| JP | 2010-181920 A | | 8/2010 |
| JP | 2014-006586 A | | 1/2014 |
| JP | 2016-085688 A | | 5/2016 |
| WO | 2018/221030 A1 | | 12/2018 |

OTHER PUBLICATIONS

Extended European Search Report dated Sep. 16, 2020, issued in counterpart European Application No. 18809856.0.

Mukherjee et al., "Unique people count from monocular videos", Visual Computer, Springer, Berlin, DE, vol. 31, No. 10, Sep. 24, 2014, pp. 1405-1417.

* cited by examiner

| START DATE AND TIME | 2017/04/21 | 00:00 |
| END DATE AND TIME | 2017/04/21 | 00:00 |

TYPE: REGION PERSON COUNT

SEARCH

DETECTION REGION

TOTALIZATION UNIT (t)

DISPLAY | CANCEL

FIG. 6B

| START DATE AND TIME | 2017/04/21 | 00:00 |
| END DATE AND TIME | 2017/04/21 | 00:00 |

TYPE: PASSING PERSON COUNT

SEARCH

DETECTION LINE

TOTALIZATION UNIT (t)

DISPLAY | CANCEL

PERSON COUNT APPARATUS, PERSON COUNT METHOD, AND NON-TRANSITORY COMPUTER-READABLE STORAGE MEDIUM

CROSS-REFERENCE TO RELATED APPLICATIONS

This application is a Continuation of International Patent Application No. PCT/JP2018/015324, filed Apr. 12, 2018 which claims the benefit of Japanese Patent Application No. 2017-107067, filed May 30, 2017, both of which are hereby incorporated by reference herein in their entirety.

BACKGROUND OF THE INVENTION

Field of the Invention

The present invention relates to a person count apparatus, a person count method, and non-transitory computer-readable storage medium.

Background Art

In recent years, surveillance cameras have increasingly been installed in various places. In addition, a technique of performing analysis for the purpose of security and sales promotion by installing surveillance cameras in a building and reproducing and browsing images captured by the surveillance cameras by the manager of the building or the like has recently been developed.

For example, PTL 1 describes a technique of detecting the number of specific objects such as persons from an image captured by an image capturing apparatus and outputting information corresponding to the number. Furthermore, PTL 2 describes a technique of displaying a detected result to be readily understood by a manager or the like. More specifically, PTL 2 discloses a system for displaying the histogram of the numbers of persons entering a predetermined area for each time period, and displaying, in response to selection of a graph of an arbitrary time period of the histogram, an image captured by an image capturing apparatus during the selected time period

CITATION LIST

Patent Literature

PTL 1: Japanese Patent Laid-Open No. 2014-6586
PTL 2: Japanese Patent Laid-Open No. 2010-181920

Depending on the purpose of analysis of an image, it is necessary to grasp, for each time period, the number of persons existing in a predetermined region and the number of persons passing a predetermined position in the predetermined region in consideration of movements of persons. In addition, it is important to present (display) the counted numbers of persons in a form to be readily understood by a manager or the like. However, the techniques disclosed in the above-described literatures do not satisfy these requirements.

The present invention provides a technique of detecting the number of persons existing in a predetermined region and the number of persons passing a predetermined position in the predetermined region and performing display in accordance with each detection method in consideration of the above-described problem.

SUMMARY OF THE INVENTION

As one solution for achieving the above object, a person count apparatus of the present invention has the following arrangement. That is, there is provided a person count apparatus comprising an obtaining unit configured to obtain a person count result of a region person count that counts the number of persons existing in a predetermined region of an image captured by an image capturing unit and a person count result of a passing person count that counts the number of persons passing a predetermined line set in an image captured by the image capturing unit; and a display control unit configured to display, on a display unit, a plurality of person count results for each time period based on the region person count based on the person count result of the region person count obtained by the obtaining unit, and displaying, on the display unit, a plurality of person count result for each time period based on the passing person count based on the person count result of the passing person count obtained by the obtaining unit, wherein the display control unit displays, on the display unit, a still image captured in a time period corresponding to a person count result which is selected from the plurality of person count results for each time period based on the region person count, and reproduces a moving image captured in a time period corresponding to a person count result which is selected from the plurality of person count results for each time period based on the passing person count.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

DESCRIPTION OF THE EMBODIMENTS

The present invention will be described in detail below based on embodiments of the present invention with reference to the accompanying drawings. Note that arrangements to be described in the following embodiments are merely examples, and the present invention is not limited to the illustrated arrangements.

Figure 1:
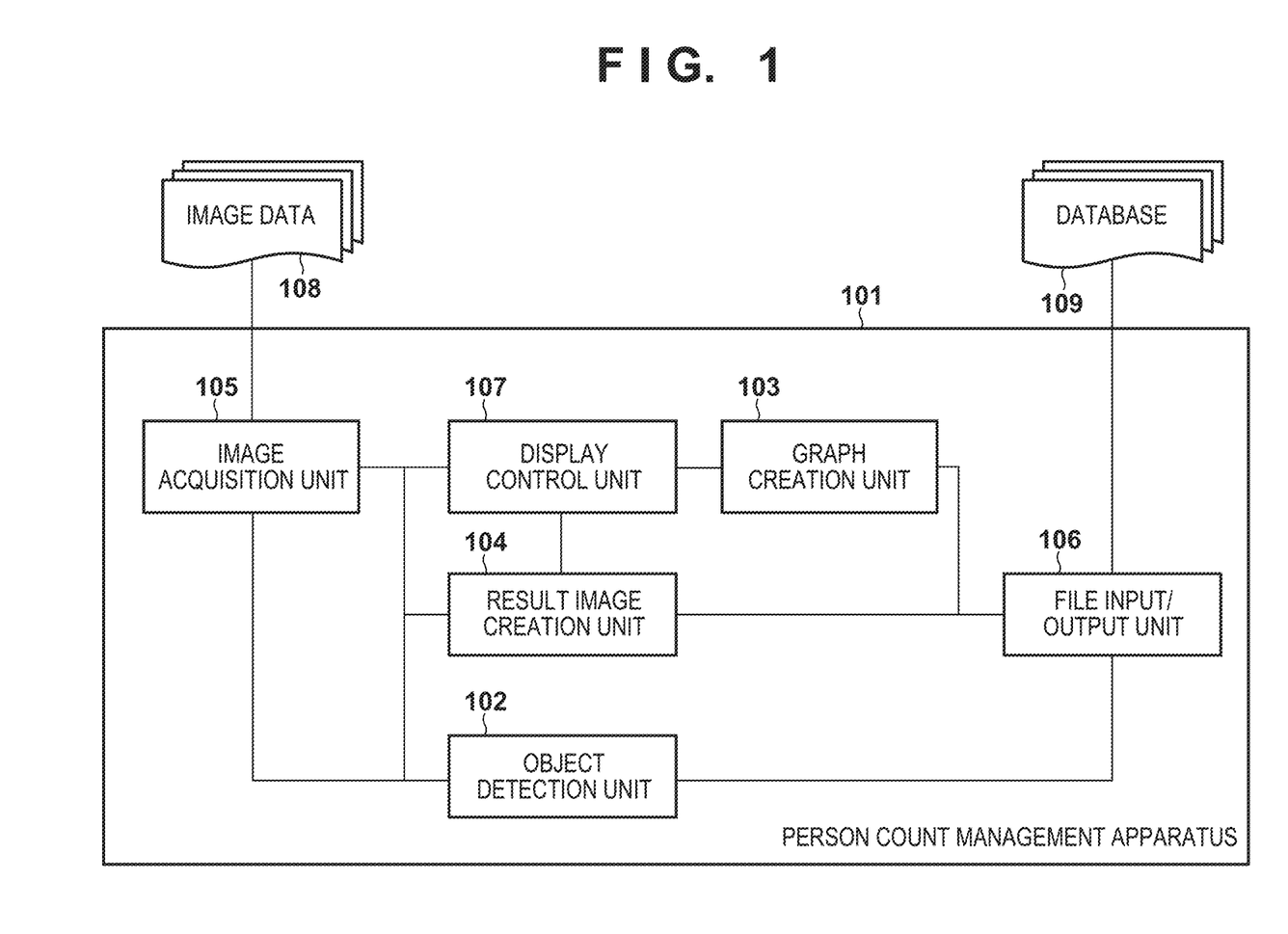
FIG. 1 is a block diagram showing an example of the functional arrangement of a person count management apparatus.

FIG. 1 shows an example of the functional arrangement of a person count management apparatus 101 according to an embodiment of the present invention. The person count management apparatus 101 includes, as functional components, an object detection unit 102, a graph creation unit 103, a result image creation unit 104, an image acquisition unit 105, a file input/output unit 106, and a display control unit 107.

Image data 108 is image data generated by performing image capturing by a camera (not shown) as an image capturing unit connected to the person count management apparatus 101. The image data 108 is saved in an HDD (Hard Disc Drive) 204 (FIG. 2) as a recording unit of the person count management apparatus 101. Note that the image data 108 can be a moving image or a still image. The image acquisition unit 105 can acquire the image data 108, and output it to the display control unit 107, the result image creation unit 104, and the object detection unit 102. The object detection unit 102 measures the number of persons in the image data 108. The object detection unit 102 can measure a person count by, for example, specifying and detecting persons using a well-known image processing technique and measuring the number of detected persons.

Figure 2:
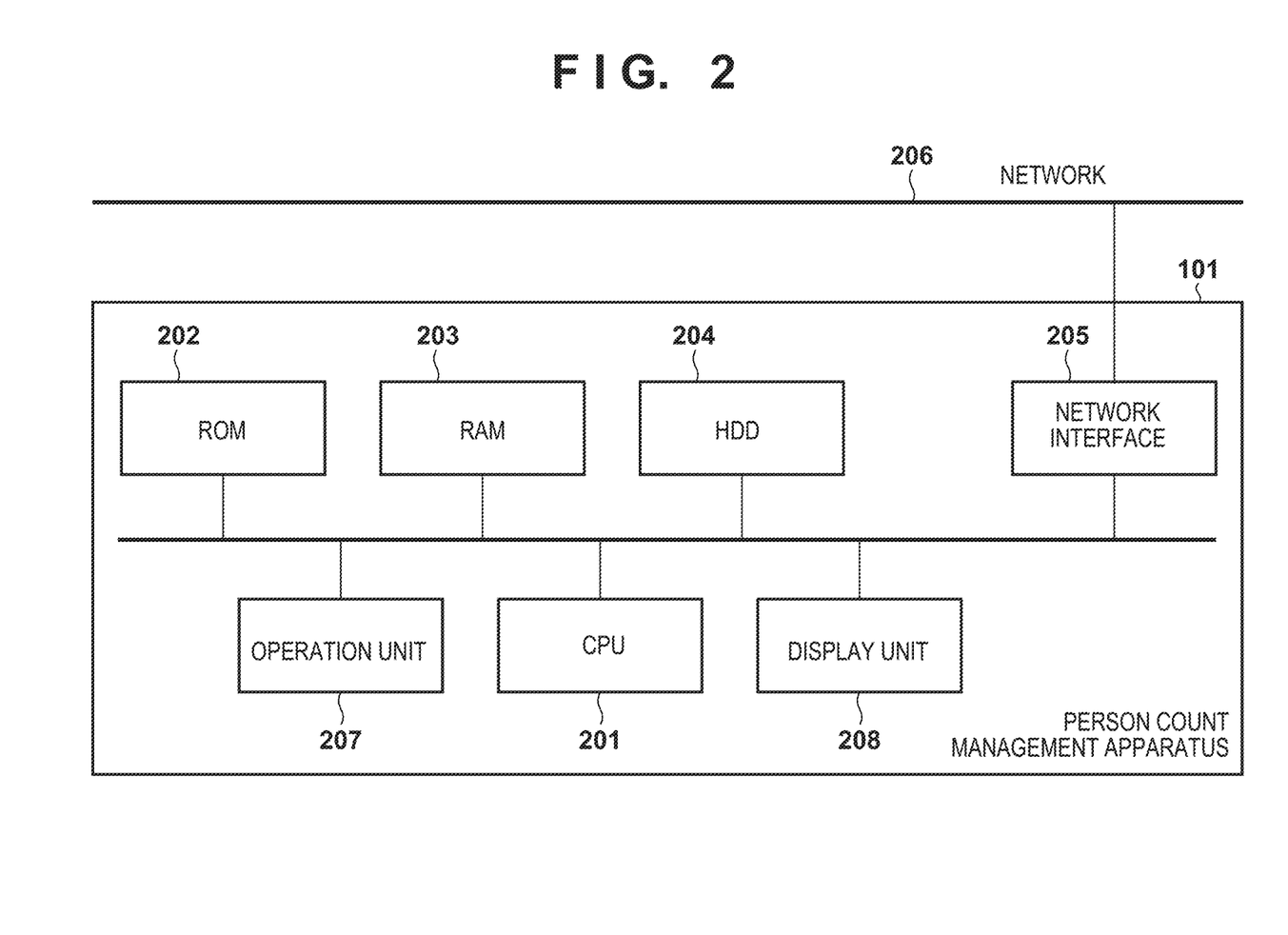
FIG. 2 is a block diagram showing an example of the hardware arrangement of the person count management apparatus.

The result image creation unit 104 creates, from the image data received from the image acquisition unit 105 or data received from a database 109 via the file input/output unit 106, a result image (person count result image) to be presented to the user. In this embodiment, the result image creation unit 104 is configured to create a result image but can create a result other than an image. The graph creation unit 103 receives, via the display control unit 107, information set in a display unit 208 (FIG. 2) by the user via an operation unit 207 (FIG. 2), and creates a graph based on the information. The display control unit 107 executes display control for the display unit 208 (FIG. 2). For example, the display control unit 107 displays, on the display unit 208, the information received from the image acquisition unit 105, the graph creation unit 103, the result image creation unit 104, or the like, and transmits the information displayed on the display unit 208 to the graph creation unit 103, the result image creation unit 104, or the like. The file input/output unit 106 inputs/outputs data to/from the database 109.

FIG. 2 shows an example of the hardware arrangement of the person count management apparatus 101 according to the embodiment of the present invention. The person count management apparatus 101 includes, as hardware components, a CPU (Central Processing Unit) 201, a ROM (Read Only Memory) 202, a RAM (Random Access Memory) 203, the HDD 204, a network interface 205, the operation unit 207, and the display unit 208.

The CPU 201 comprehensively controls the person count management apparatus 101. The ROM 202 stores a program and the like to be used by the CPU 201 to control the person count management apparatus 101. Note that a secondary storage device may be used instead of the ROM 202. The RAM 203 is a memory for deploying a program read out from the ROM 202 and for executing processing. The RAM 203 serves as a temporary storage memory, and is also used as a storage area to temporarily store data to undergo various processes. The HDD 204 stores the database 109. The network interface 205 serves as an interface for performing communication via a network 206 to acquire the image data 108 of a connection destination. The display unit 208 is a device including a screen such as a display for displaying the information received from the image acquisition unit 105, the graph creation unit 103, the result image creation unit 104, or the like. The operation unit 207 is used by an input operation performed by the user, and includes, for example, a mouse and a touch panel.

As described above, the hardware arrangement of the person count management apparatus 101 includes the same hardware components as those mounted on a general PC (Personal Computer). Therefore, various functions implemented by the person count management apparatus 101 can be implemented as software operating on a general PC.

Figure 3:
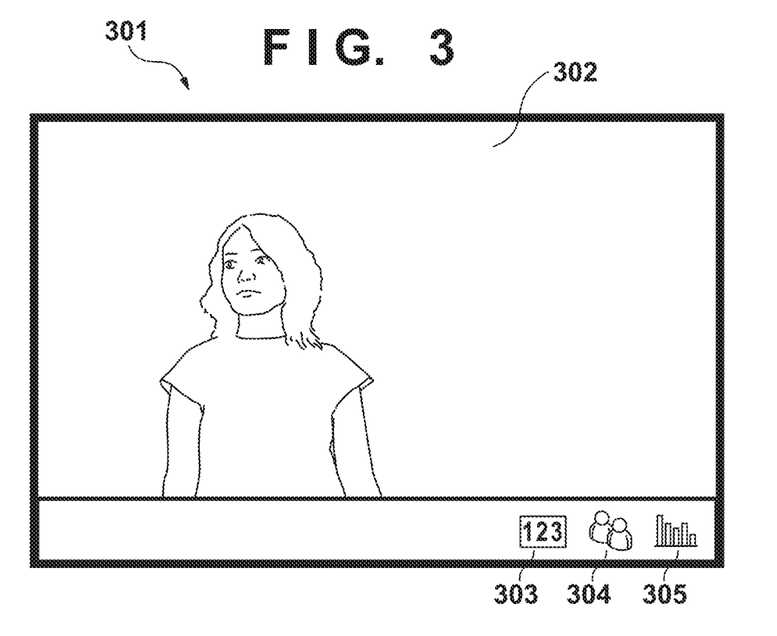
FIG. 3 is a view showing an example of an image of the main window of a display unit 208.

The operation of the person count management apparatus 101 will be described. First, the display control unit 107 displays the image data 108 received via the image acquisition unit 105 on the screen of the display unit 208. FIG. 3 shows an example of an image of the main window of the screen of the display unit 208. Referring to FIG. 3, a main window 301 includes an image display area 302, a region person count button 303, a passing person count button 304, and a graph setting dialog activation button 305.

In the image display area 302, the image of the image data 108 acquired by the image acquisition unit 105 via the network interface 205 is displayed. The region person count button 303 is a button for instructing to count the number of persons existing in a predetermined region for each time period. The passing person count button 304 is a button for instructing to count the number of persons passing a predetermined position in the predetermined region for each time period. The graph setting dialog activation button 305 is a button for instructing to display, on the display unit 208, a graph setting dialog to be used to make settings for creating/displaying a graph.

The operation of the person count management apparatus 101 when the user selects each of the region person count button 303, the passing person count button 304, and the graph setting dialog activation button 305 via the operation unit 207 will be described below.

A case in which the user selects the region person count button 303 via the operation unit 207 will first be explained. Note that the image data 108 for which the object detection unit 102 measures the number of persons when the region person count button 303 is selected is a moving image or a still image. In response to selection of the region person count button 303, the object detection unit 102 measures the number (person count) of persons in the image data 108. The object detection unit 102 continuously acquires the image data 108, and continuously measures the person count. The object detection unit 102 outputs, as measurement data, pieces of information of the image capturing time of the image data 108 as a person count measurement target, the measured person count, the coordinates and size of each detected person in the image, and the image data 108 to the file input/output unit 106 in association with each other. The file input/output unit 106 saves the measurement data received from the object detection unit 102 in the database 109. Note that the saving destination of the data is not limited to the database 109.

Figure 4:
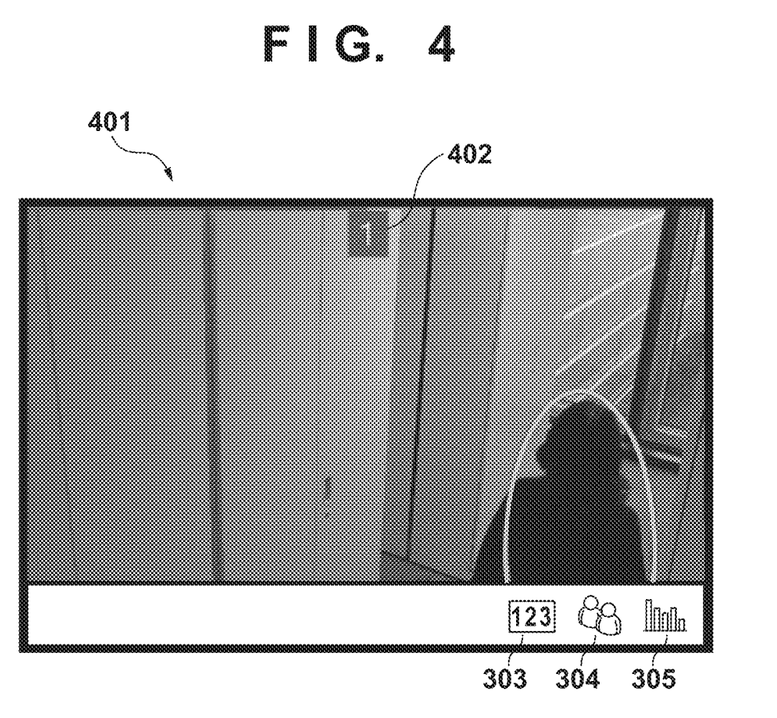
FIG. 4 is a view showing an example of an image of the main window of the display unit 208 during region person counting.

FIG. 4 shows an example of an image of the main window of the screen of the display unit 208 during person count measurement performed by the object detection unit 102 when the region person count button 303 is selected. The display control unit 107 displays the image data 108 in a main window 401 of the screen of the display unit 208. In addition, the display control unit 107 displays information of the person count measured by the object detection unit 102 in the main window 401 like a number 402.

A case in which the user selects the passing person count button 304 via the operation unit 207 will be described next. Note that the image data 108 which serves as a person count measurement target of the object detection unit 102 when the passing person count button 304 is selected is a moving image. In response to selection of the passing person count button 304, the object detection unit 102 measures the numbers of persons passing a detection line (passage line) set in the image of the image data 108 both in the same direction (positive direction) as a set direction and in a direction (opposite direction) opposite to the set direction. The detection line and the direction may be set by the user, as will be described later with reference to FIG. 6B, or may be set by the CPU 201 by giving a predetermined condition to the person count management apparatus 101. The object detection unit 102 measures the number of persons passing in the positive direction as an In person count, and measures the number of persons passing in the opposite direction as an Out person count.

The object detection unit 102 continuously acquires the image data 108, and continuously measures the person count. The object detection unit 102 outputs, as measurement data, pieces of information of the image capturing time of the image data 108 as a person count measurement target, the measured person count, the coordinates and size of each detected person in the image, the set detection line, the set direction (positive direction), and the image data 108 to the file input/output unit 106 in association with each other. The file input/output unit 106 saves the measurement data received from the object detection unit 102 in the database 109. Note that the saving destination of the data is not limited to the database 109.

Figure 5:
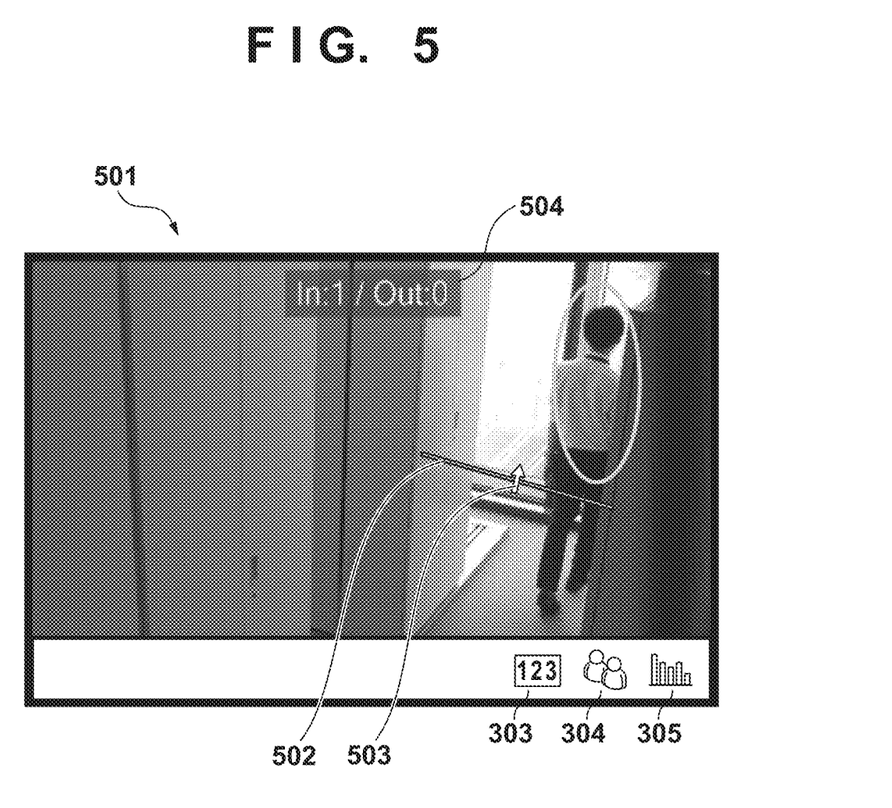
FIG. 5 is a view showing an example of an image of the main window of the display unit 208 during passing person counting.

FIG. 5 shows an example of an image of the main window of the screen of the display unit 208 during person count measurement performed by the object detection unit 102 when the passing person count button 304 is selected. The display control unit 107 displays the image data 108 in a main window 501 of the screen of the display unit 208. The display control unit 107 also displays a detection line 502 and an arrow 503 of the positive direction in the main window 501. Furthermore, the display control unit 107 displays the information of the In person count and the Out person count measured by the object detection unit 102 in the main window 501 like numbers 504.

A case in which the user selects the graph setting dialog activation button 305 via the operation unit 207 will be described next. In response to selection of the graph setting dialog activation button 305, the display control unit 107 displays, on the screen of the display unit 208, the graph setting dialog to be used to make settings for creating/displaying a graph.

Figure 6A:
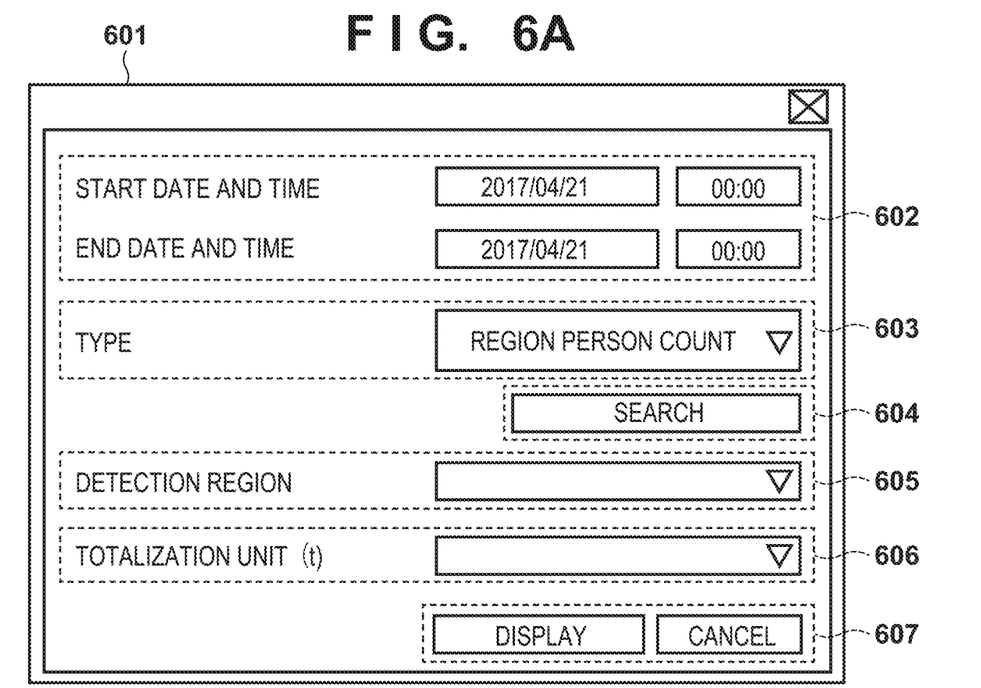
FIG. 6A is a view showing a graph setting dialog image at the time of region person counting.
Figure 6B:
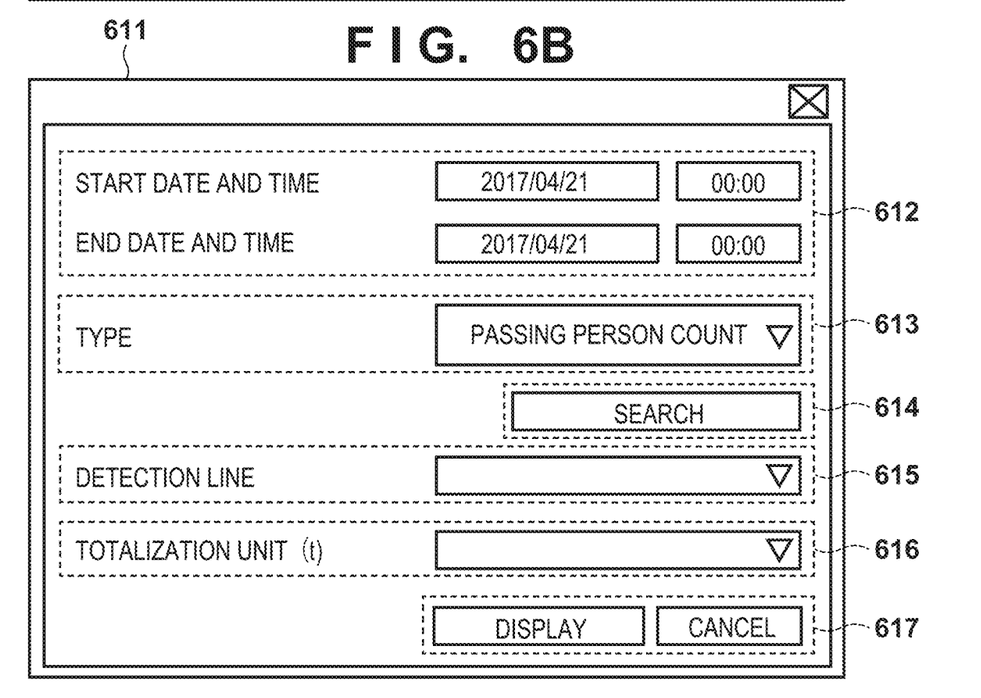
FIG. 6B is a view showing a graph setting dialog image at the time of passing person counting.

FIGS. 6A and 6B each show an example of the graph setting dialog. FIG. 6A shows a graph setting dialog 601 when the user selects a "region person count" in a type setting region 603 (to be described later). FIG. 6B shows a graph setting dialog 611 when the user selects a "passing person count" in a type setting region 613. In response to completion of various settings in the graph setting dialog 601 or 611 by the user via the operation unit 207, the graph creation unit 103 performs plotting processing.

The graph setting dialog 601 shown in FIG. 6A includes a start date and time/end date and time setting region 602, the type setting region 603, a search button 604, a detection region setting region 605, a totalization unit setting region 606, and display/cancel buttons 607. An operation for each button/region is performed via the operation unit 207.

The start date and time/end date and time setting region 602 is a region where a graph creating target period is set, and the user sets the target period by specifying a start date and time and an end date and time. In the type setting region 603, the user can select one of the "region person count" and the "passing person count" from, for example, a pull-down list. If the "region person count" is selected, the graph creation unit 103 creates a graph corresponding to the person count measured in response to selection of the region person count button 303. If the "passing person count" is selected, the graph creation unit 103 creates a graph corresponding to the person count measured in response to selection of the passing person count button 304.

When the user completes the settings in the start date and time/end date and time setting region 602 and the type setting region 603, and selects the search button 604, the detection region setting region 605 and the totalization unit setting region 606 which have been selected by the CPU 201 to correspond to the settings in the start date and time/end date and time setting region 602 and the type setting region 603 are displayed. The detection region setting region 605 is a region where an image capturing target region is set, and the user can select the region from, for example, a pull-down list. Note that it may be configured to designate, as the detection region setting region 605, the image capturing unit used to generate the image data 108. The totalization unit setting region 606 is a region where the totalization unit time of graph creation is set, and the user can select the region from, for example, a pull-down list.

When the settings in the regions up to the totalization unit setting region 606 are complete, and the user selects the display button of the display/cancel buttons 607, the graph creation unit 103 creates a graph based on the set information. After the graph is created, the display control unit 107 displays a screen shown in FIG. 7 (to be described later) on the display unit 208. If the settings are modified, the user selects the cancel button of the display/cancel buttons 607, and makes settings again.

On the other hand, the graph setting dialog 611 shown in FIG. 6B includes a start date and time/end date and time setting region 612, a type setting region 613, a search button 614, a detection line setting region 615, a totalization unit setting region 616, and display/cancel buttons 617. An operation for each button/region is performed via the operation unit 207.

The start date and time/end date and time setting region 612, the type setting region 613, the search button 614, the totalization unit setting region 616, and the display/cancel buttons 617 are similar to the start date and time/end date and time setting region 602, the type setting region 603, the search button 604, the totalization unit setting region 606, and the display/cancel buttons 607 in FIG. 6A, respectively, and a description thereof will be omitted. The detection line setting region 615 is a region where the detection line 502 shown in FIG. 5 and a direction as a positive direction are selected from, for example, a pull-down list.

When the settings in the regions up to the totalization unit setting region 616 are complete, and the user selects the display button of the display/cancel buttons 607, the graph creation unit 103 creates a graph based on the set information. After the graph is created, the display control unit 107 displays a screen shown in FIG. 9 (to be described later) on the display unit 208. If the settings are modified, the user selects the cancel button of the display/cancel buttons 617, and makes settings again.

Note that the graph setting dialogs shown in FIGS. 6A and 6B are merely examples. Other arrangements may be adopted as long as it is possible to make settings for creating/displaying a graph.

Figure 7:
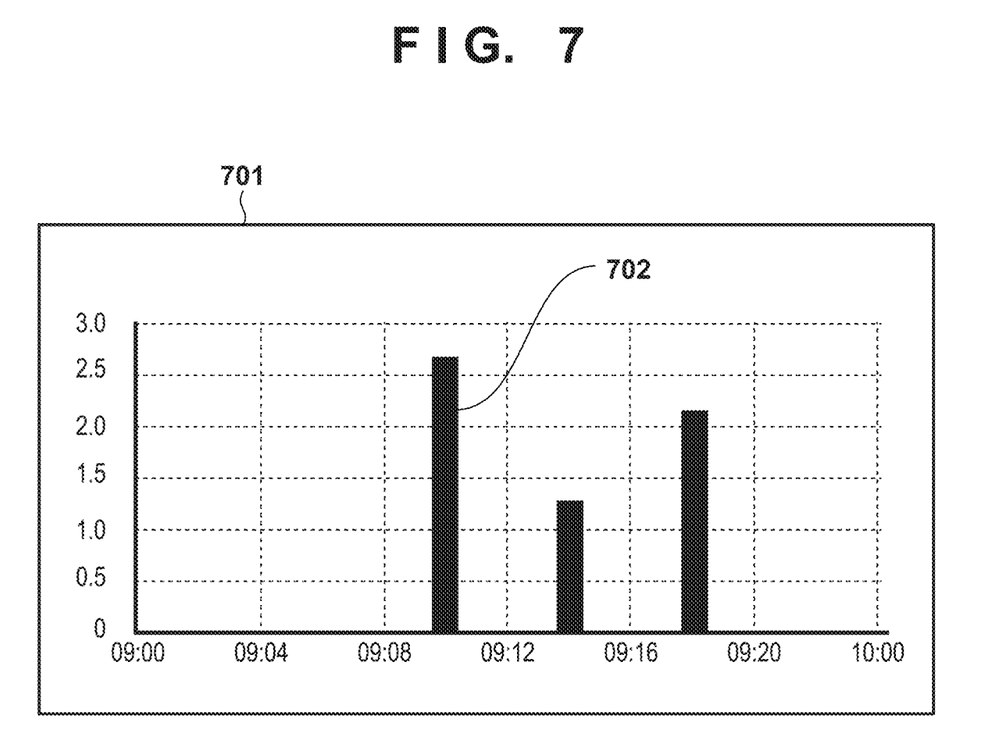
FIG. 7 is a view showing a region person count graph image.

FIG. 7 shows an example of a region person count graph 701 created by the graph creation unit 103 in accordance with the user settings in the graph setting dialog 601 shown in FIG. 6A and displayed on the screen of the display unit 208 by the display control unit 107. In the region person count graph 701, the ordinate represents the person count and the abscissa represents the time. The time of the abscissa includes at least a period from the start date and time to the end date and time which have been set in the start date and time/end date and time setting region 602 shown in FIG. 6A. A bar 702 as one of graph elements indicates the average of the numbers of persons counted when measurement processing is performed a plurality of times during a period of 09:08 to 09:12 along the totalization unit time (the totalization unit time is 4 min in the example of FIG. 7) set in the totalization unit setting region 606 shown in FIG. 6A. Although in FIG. 7, each bar as each graph element indicates the average of the numbers of persons counted in each totalization unit time, a maximum person count, a minimum person count, or a combination thereof, which is measured in each totalization unit time may be indicated instead. If measurement is performed only once in each totalization unit time, the person count is displayed intact as a measurement result.

When the user selects the bar 702 via the operation unit 207, the result image creation unit 104 selects measurement data whose image capturing time is earliest among the measurement data which are measured in a time period of a totalization time unit in which the selected bar 702 exists and saved in the database 109. Then, the result image creation unit 104 acquires, from the database 109 via the file input/output unit 106, the measured person count, the coordinates and size of each detected person in the image, and the image data, all of which are included in the selected measurement data. If it is impossible to acquire the image data from the measurement data, the result image creation unit 104 may acquire the image data 108 from the image acquisition unit 105. Subsequently, the result image creation unit 104 creates a result from the acquired data. In this embodiment, the result image creation unit 104 creates a region person count result image to be displayed as a result on the display unit 208.

Figure 8A:
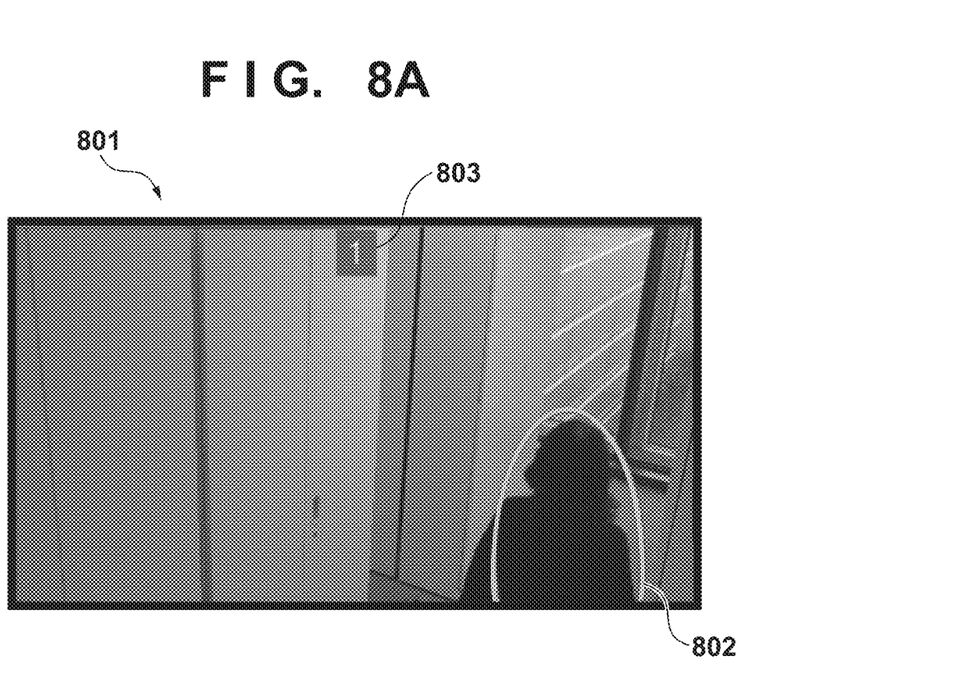
FIG. 8A is a view showing a region person count result image.

FIG. 8A shows a region person count result image 801 thus created by the result image creation unit 104. The region person count result image 801 is a still image, and is, for example, an image obtained by superimposing, on the measurement target image data, an ellipse 802 obtained from the coordinates and size of the detected person and a measured person count 803. The region person count result image 801 is displayed in the image display area 302. Note that another graphic pointing out the detected person may be used instead of the ellipse 802.

Figure 8B:
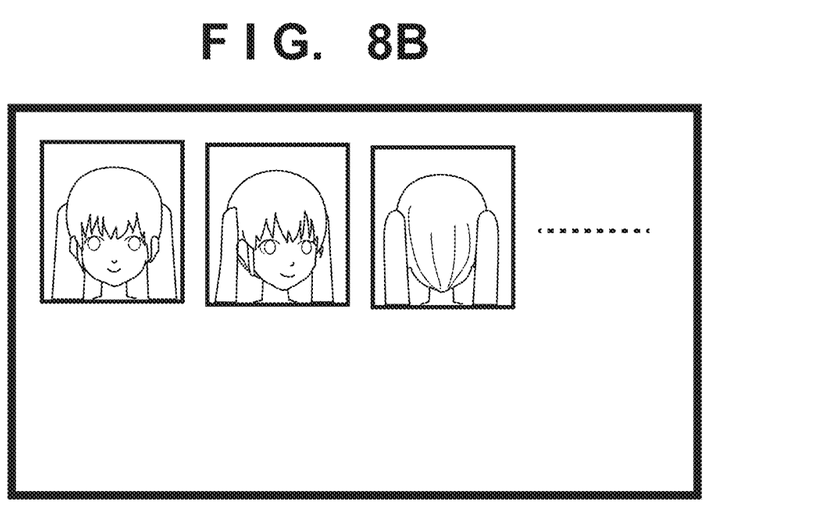
FIG. 8B is a view showing a region person count result image.

Note that although FIG. 8A shows an example in which the region person count result image 801 for one measurement data is created from one bar as one graph element and displayed, the present invention is not limited to this. For example, the result image creation unit 104 may create a plurality of region person count result images in correspondence with all the measurement data which have been measured in the time period of the totalization unit time in which one bar exists and saved in the database, and the display control unit 107 may display these images in time series or simultaneously. Alternatively, the result image creation unit 104 can create, as a plurality of region person count result images 801, images respectively representing a plurality of detected persons, and the display control unit 107 can display the images in time series or simultaneously (FIG. 8B).

Figure 9:
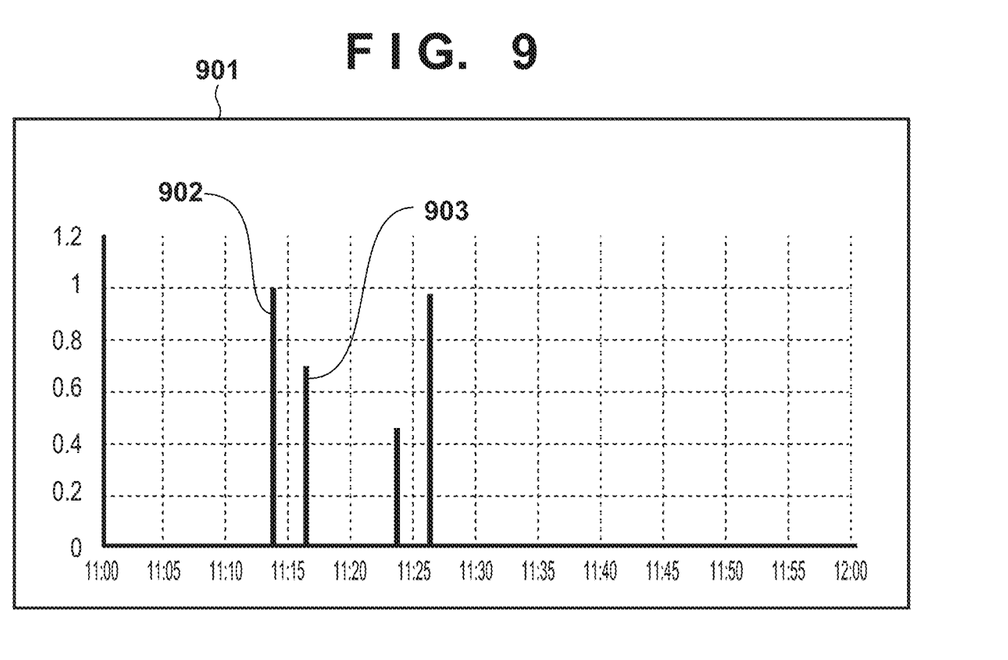
FIG. 9 is a view showing a passing person count graph image.

FIG. 9 shows an example of a passing person count graph 901 created by the graph creation unit 103 in accordance with the user settings in the graph setting dialog 611 shown in FIG. 6B and displayed on the screen of the display unit 208 by the display control unit 107. In the passing person count graph 901, the ordinate represents the person count and the abscissa represents the time. The time of the abscissa includes at least a period from the start date and time to the end date and time which have been set in the start date and time/end date and time setting region 612 shown in FIG. 6B. Bars 902 and 903 respectively indicate the In person count and the Out person count obtained during a period of 11:10 to 11:20 along the totalization unit time (the totalization unit time is 10 min in the example of FIG. 9) set in the totalization unit setting region 616 shown in FIG. 6B.

When the user selects the bar 902 via the operation unit 207, the result image creation unit 104 operates, as follows.

(1) The result image creation unit 104 selects the measurement data whose image capturing time is earliest, among the measurement data which have been measured in the time period of the totalization unit time in which the selected bar 902 exists and saved in the database 109.

(2) The result image creation unit 104 acquires, from the database 109 via the file input/output unit 106, the measured person count, the coordinates and size of each detected person in the image, and the image data, all of which are included in the selected measurement data. If it is impossible to acquire the image data from the measurement data, the result image creation unit 104 acquires the image data 108 from the image acquisition unit 105.

Figure 10:
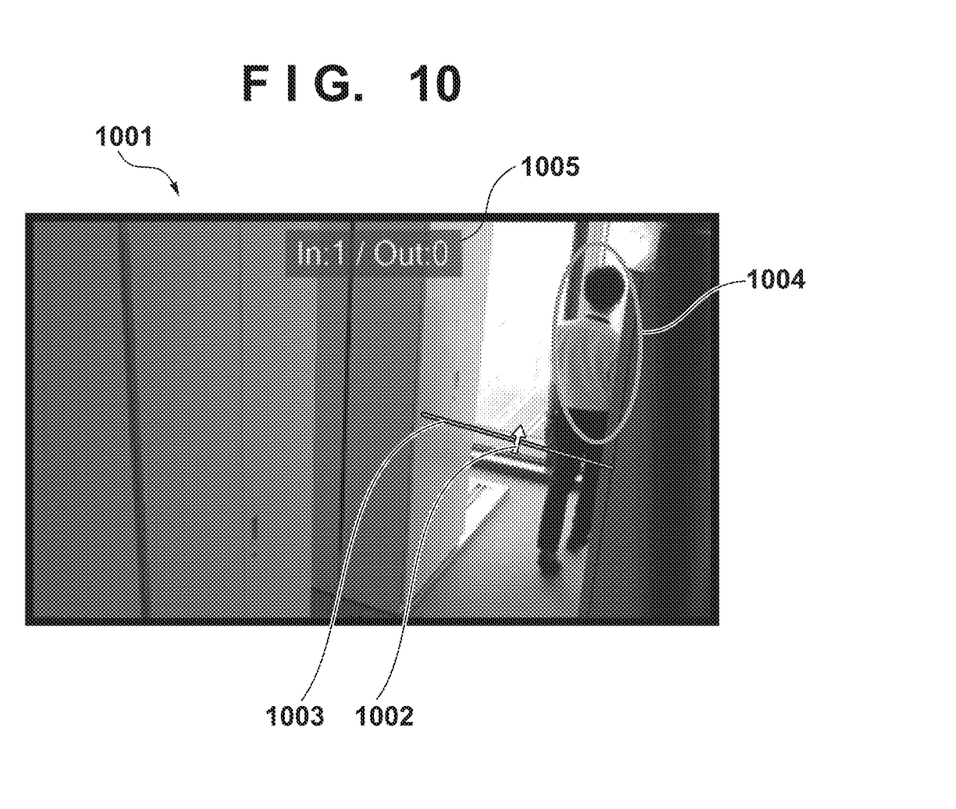
FIG. 10 is a view showing a passing person count result image.

(3) The result image creation unit 104 creates, from the acquired data, a passing person count result image to be displayed as a result on the display unit 208. FIG. 10 shows a passing person count result image 1001 thus created by the result image creation unit 104. The passing person count result image 1001 is a moving image, and is, for example, an image obtained by superimposing, on the measurement target image data, an ellipse 1004 obtained from the coordinates and size of the detected person, a detection line 1003, an arrow 1002 indicating a positive direction, and measured person counts 1005. The passing person count result image 1001 is reproduced/displayed in the image display area 302. Note that another graphic pointing out the detected person may be used instead of the ellipse 1004.

(4) By returning to (1), the result image creation unit 104 selects the measurement data, whose image capturing time is second earliest, in the time period of the totalization unit time in which the bar 902 exists. If there is no measurement data, the operation ends.

As the display form (the form of the passing person count result image 1001) of (3) above, the following forms are also possible.

(A) If a bar representing the number (In person count) of persons passing the detection line in the positive direction is selected, only an image at an instance (a predetermined time before and after passing) when a person passes the detection line in the positive direction is created and displayed as at least part of the passing person count result image 1001.

(B) If a bar representing the number (Out person count) of persons passing the detection line in the opposite direction is selected, only an image at an instance (a predetermined time before and after passing) when a person passes the detection line in the opposite direction is created and displayed as at least part of the passing person count result image 1001.

(C) If bars representing the numbers (In person count and Out person count) of persons in the positive direction and the opposite direction are selected, result images of data of a time period of a time unit in which the bars exist regardless of the direction are created as at least parts of the passing person count result image 1001, and all the images are displayed in time series or simultaneously.

As described above, according to this embodiment, measured results can be saved, the saved results can be called later, the results during a specific period can be plotted and displayed, and a measurement result image as a graph element can be displayed from the displayed graph. It is possible to present, to the user, display to be analyzed more easily, by changing the display form in accordance with the type of a person count to be measured.

According to the present invention, it is possible to detect the number of persons existing in a predetermined region and the number of persons passing a predetermined position in the predetermined region, and to perform display in accordance with each detection method.

Other Embodiments

Embodiment(s) of the present invention can also be realized by a computer of a system or apparatus that reads out and executes computer executable instructions (e.g., one or more programs) recorded on a storage medium (which may also be referred to more fully as 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. An information apparatus comprising a processor executing instructions that, when executed by the processor, cause the processor to operate to:
   obtain a first count result which is a result of a region person count that counts the number of persons existing in a predetermined region in an image;
   obtain a second count result which is a result of a passing person count that counts the number of persons passing a predetermined line set in an image; and
   cause a display unit to: (a) display, when it is determined to do so, a plurality of first elements, each of which corresponds to a totalization result of the first count result in a different time period; and (b) display, when it is determined to do so, a plurality of second elements, each of which corresponds to a totalization result of the second count result in a different time period,
   wherein in a case where one of the plurality of first elements has been selected, a still image is to be displayed in the display, the still image having been captured in a time period corresponding to the selected one of the plurality of first elements, and
   wherein in a case where one of the plurality of second elements has been selected, a moving image is to be reproduced, the moving image having been captured in a time period corresponding to the selected one of the plurality of second elements.

2. The apparatus according to claim 1, wherein for each time period, the totalization result of the first count result corresponds to (a) the average number of the first count result in the time period, (b) a maximum number of the first count result in the time period, or (c) a minimum number of the first count result in the time period.

3. The apparatus according to claim 1, wherein for each time period, the totalization result of the second count result corresponds to (a) the number of persons passing the predetermined line in a predetermined direction in the time period and (b) the number of persons passing the predetermined line in a direction opposite to the predetermined direction in the time period.

4. The apparatus according to claim 1, wherein (a) information indicating the number of persons counted from the still image to be displayed and (b) information indicating a person detected from the still image to be displayed are superimposed on the still image displayed on the display.

5. The apparatus according to claim 1, wherein (a) information indicating the number of persons counted by the passing person count from the moving image to be reproduced and (b) information indicating the predetermined line are superimposed on the moving image reproduced on the display.

6. The apparatus according to claim 1, wherein the still image to be displayed is selected from among a plurality of still images captured in a time period corresponding to the selected one of the plurality of first elements.

7. The apparatus according to claim 6, wherein the selected still image is an earliest captured one among the plurality of still images captured in the time period corresponding to the selected one of the plurality of first elements.

8. An information processing method comprising:
   obtaining a first count which is a result of a region person count that counts the number of persons existing in a predetermined region in an image;
   obtaining a second count result which is a result of a passing person count that counts the number of persons passing a predetermined line set in an image; and causing a display to: (a) display, when it is determined to do so, a plurality of first elements, each of which corresponds to a totalization result of the first count in a different time period; and (b) display, when it is determined to do so, a plurality of second elements, each of which corresponds to a totalization result of the second count result in a different time period, wherein in a case where one of the plurality of first elements has been selected, a still image is to be displayed in the display, the still image having been captured in a time period corresponding to the selected one of the plurality of first elements, and wherein in a case where one of the plurality of second elements has been selected, a moving image is to be reproduced, the moving image having been captured in a time period corresponding to the selected one of the plurality of second elements.

9. A non-transitory computer-readable storage medium storing a computer program for causing a computer to execute an information processing method, the method comprising:

obtaining a first count which is a result of a region person count that counts the number of persons existing in a predetermined region in an image;

obtaining a second count result which is a result of a passing person count that counts the number of persons passing a predetermined line set in an image; and causing a display to: (a) display, when it is determined to do so, a plurality of first elements, each of which corresponds to a totalization result of the first count in a different time period; and (b) display, when it is determined to do so, a plurality of second elements, each of which corresponds to a totalization of the second count result in a different time period, wherein in a case where one of the plurality of first elements has been selected, a still image is to be displayed in the display, the still image having been captured in a time period corresponding to the selected one of the plurality of first elements, and wherein in a case where one of the plurality of second elements has been selected, a moving image is to be reproduced, the moving image having been captured in a time period corresponding to the selected one of the plurality of second elements.

* * * * *